United States Patent
Daigle

[15] 3,667,149
[45] June 6, 1972

[54] ALL-PURPOSE FISHING FLOAT

[72] Inventor: Jules O. Daigle, P.O. Box 515, Welsh, La. 70591

[22] Filed: Oct. 24, 1969

[21] Appl. No.: 869,110

[52] U.S. Cl. .......................................... 43/43.15, 43/44.91
[51] Int. Cl. ............................................................ A01k 93/00
[58] Field of Search .............. 43/43.15, 44.87, 44.91, 44.88, 43/44.93, 44.92, 44.95, 44.14, 44.9

[56] References Cited

UNITED STATES PATENTS

| | | | |
|---|---|---|---|
| 862,853 | 8/1907 | Simmons | 43/44.91 |
| 322,088 | 7/1885 | Behrens | 43/44.91 X |
| 958,581 | 5/1910 | Blank | 43/44.91 |
| 1,468,720 | 9/1923 | Low | 43/43.15 X |
| 2,302,549 | 11/1942 | Hodges | 43/44.87 |
| 2,315,048 | 3/1943 | Croft | 43/43.15 X |
| 3,425,151 | 2/1969 | Salfer | 43/44.91 X |

*Primary Examiner*—Hugh R. Chamblee
*Attorney*—Victor J. Evans and Co.

[57] ABSTRACT

A rigid plastic tube is inserted through the central opening of a conventional float and retained therein by friction or any other suitable means and the portion of the tube above the float is provided with a plurality of radial openings, preferably vertically aligned. A fishing line is inserted through the top of the tube, then outwardly through the uppermost of the openings, thence inwardly through another opening, thence downwardly through the tube and provided therebeneath with a leader, sinker and hook or lure. A sleeve, slidably mounted on the tube above the float, may occupy a neutral position below the radial openings for the relatively free sliding of the fishing line upwardly or downwardly, and, the sleeve may be put in an operative position over the portion of the line lying outwardly of the tube to gently impede the free movement of the line axially to the tube.

2 Claims, 6 Drawing Figures

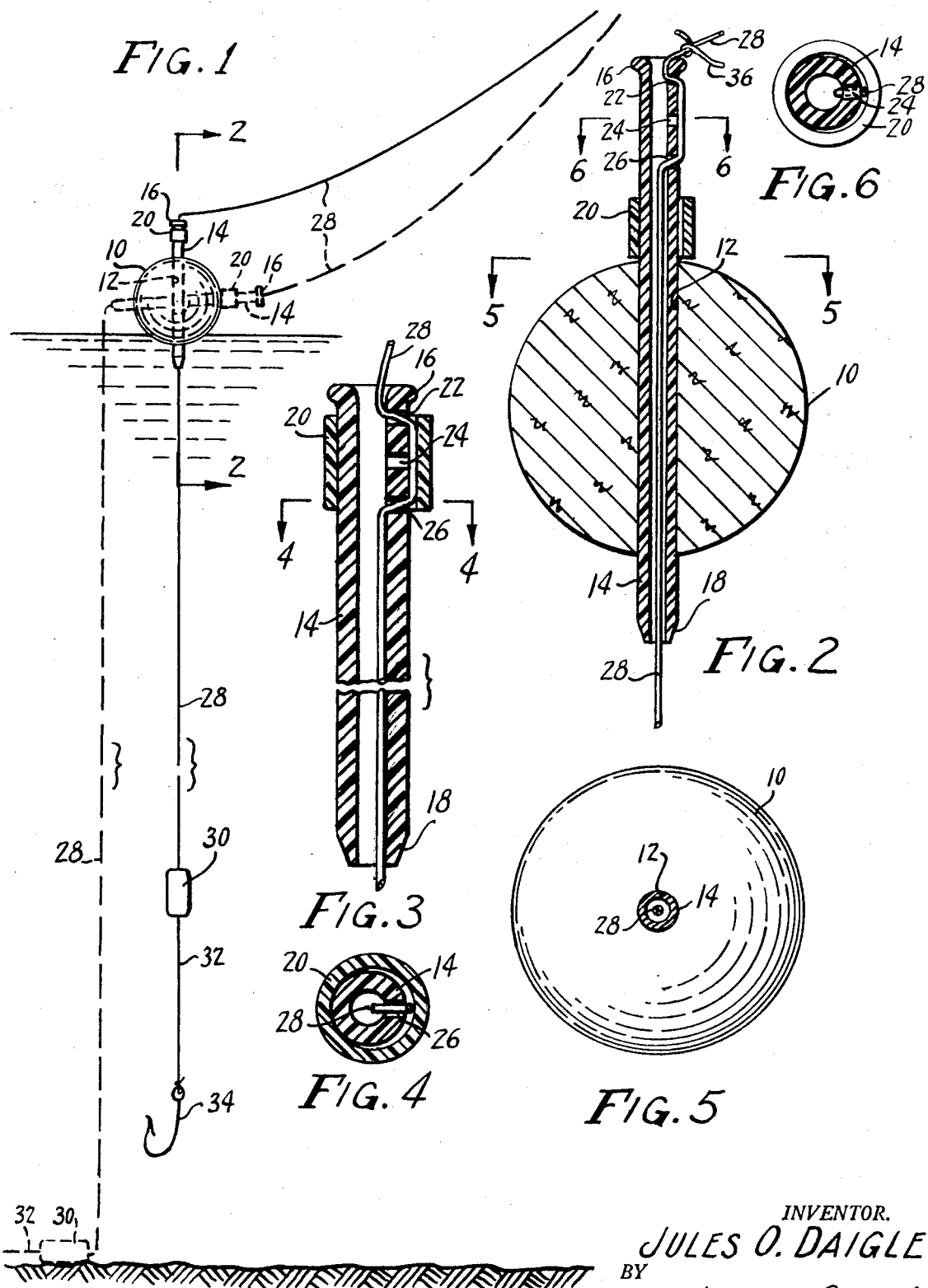

ALL-PURPOSE FISHING FLOAT

BACKGROUND OF THE INVENTION

This invention relates to the field of still fishing with a pole and of bait casting with rod and reel. The purpose of the invention is to provide a simple, durable and trouble-free float assembly which is ideally adapted to both of the above mentioned types of fishing and which permits float-fishing at any depth including bottom-fishing. While numerous attempts have been made by others to provide such a float, none of these employ the specific design embodied herein, nor do they achieve a comparably simple, durable and trouble-free device for effecting the desired goal of an all-purpose float.

SUMMARY OF THE INVENTION

The device makes use of a conventional float element of any desired type or composition, having a central opening therethrough. The device comprises a tube of relatively hard plastic, having an opening entirely therethrough and of a substantially greater length than the length of the opening through the conventional float used. The tube is preferably of uniform cross-section throughout its length except that it is preferably provided, at its upper end, with an outwardly flared rim for the purpose to be described, and preferably has its outer surface tapered at its lower end, so as to gradually decrease in diameter to the lower extremity of the tube to facilitate its insertion through the opening in the conventional float, in which opening the tube is held by frictional engagement with float or by any other suitable means.

A sleeve which is preferably made of soft plastic or rubber is fitted around the upper portion of the tube, said sleeve to be of slightly greater internal diameter than the external diameter of the tube, and the sleeve may occupy an upper operative position, to be described, or a lower inoperative position resting on the top of the float element. Between its flared upper end and the upper end of the sleeve when in the inoperative position, the tube is provided with preferably three vertically aligned and vertically spaced radial openings, although the holes could be aligned spirally or horizontally.

The fishing line extends into the upper end of the tube, then outwardly through the uppermost radial opening and downwardly of the tube, thence inwardly through a lower radial opening and downwardly through the tube. After the line has thus been inserted, the lower extremity of the line is provided with the usual leader, sinker and hook or lure.

BRIEF DESCRIPTION OF THE DRAWINGS

FIG. 1 is a side elevation of the device shown in position in the water, with the fishing being done above the bottom; the position of the parts when bottom-fishing being shown in dotted lines;

FIG. 2 is a vertical sectional view through the tube, float and associated elements;

FIG. 3 is an enlarged axial sectional view through the tube and sleeve, with a portion of tube being broken away;

FIG. 4 is a sectional line through line 4—4 of FIG. 3;

FIG. 5 is a sectional line 5—5 of FIG. 2; and

FIG. 6 is a similar view of line 6—6 of FIG. 2.

DESCRIPTION OF PREFERRED EMBODIMENT

Referring particularly to FIGS. 1, 2 and 5, the numeral 10 designates a float, shown in the present instance as being spherical and formed of cork, but it will be apparent that any desired type of float, formed of any suitable material may be employed. The float, in the present instance, is provided with a diametrical opening 12 extending entirely therethrough, and a tube 14 extends through this opening and projects above and below the float. The tube is preferably made of any suitable hard plastic and is preferably uniform in cross-sectional shape from end to end except that it is preferably provided, at its upper end, with an annular flared flange 16 while its lower end preferably has its outer surface tapered as at 18 to decrease in diameter to the lower extremity of tube. This tapered lower end facilitates the insertion of the tube through the float as will be apparent.

Above the float 10 as viewed in FIG. 2 the tube 14 is provided with a preferably flexible sleeve 20, the internal diameter of which is slightly greater than the external diameter of the tube. This sleeve is adapted to assume either a neutral or inoperative position as shown in FIG. 2 or an upper or operative position as shown in FIG. 3, as further described below.

Between the upper flange 16 and the sleeve 20, when the latter is in the inoperative position, the tube 14 is provided with preferably three vertically spaced vertically aligned openings 22, 24 and 26. In practice, for most types of sport fishing, it has been found preferable to space these openings about one-fourth inch apart, with the uppermost opening 22, just below the flange 16, to facilitate insertion of line from top of tube. The distance between the openings, within certain limits, is governed by the size of line to be used. The openings 22, 24 and 26 may be perpendicular to the axis of the tube or opening 22 may be obliquely directed toward upper tip of tube whereas openings 24 and 26 may be directed downwardly toward lower end of tube. The oblique direction of openings facilitates threading of the line through them. A fishing line 28 is inserted into the upper end of tube 14, and then is threaded outwardly through the opening 22. The line is extended downwardly along the tube 14, externally thereof, and it is then threaded through either of the openings 24 or 26, then extends downwardly through the tube 14 to project from the lower end thereof. For a reason which will become apparent, the line, if light, is threaded inwardly through opening 24, while a heavier line is extended inwardly through opening 26. The lower extremity of the line 28 may be provided with customary leader 32 which bears a suitable sinker 30 and a hook 34 or lure (not shown). Under some conditions to be described, a short piece of string 36 (FIG. 2) may be tied to line 28 as shown in FIG. 2.

OPERATION

In assembling the device, tube 14 is slipped into sleeve 20 and the lower end of tube is then inserted through opening 12 of float 10 as shown in FIG. 2, and the tube will be held in position in opening 12 by friction or by any other suitable means. The sleeve 20, in its neutral position will rest against float 10 and movement of sleeve from the upper end of tube will be prevented by the flange 16. This flange also reinforces the upper end of tube and by enlarging its diameter, prevents it from being forced into the rod tip when the line is retrieved after casting. The line 28 is then inserted into the upper end of tube 14 and threaded outwardly through opening 22; thence it is extended downwardly, externally of the tube, and threaded inwardly through either of the openings 24 or 26 depending on the size of the line used. The line is then extended downwardly through the lower end of the tube and a suitable leader, sinker and hook or lure is attached to it.

In the event the device is to be used for still fishing with a pole, at any practicable depth, or for fishing with rod and reel to a depth of about 5 feet or less, the angler will first set the sleeve 20 in the operative position as shown in FIG. 3. He will then manually pull out as much of the line as desired from below the float assembly. He then fishes in the customary way. It should be noted that the pressure of the sleeve 20 on the line is just enough to prevent the weight of the sinker from pulling the line through the float assembly but not enough to hinder the manual movement of the line through the device, nor enough to make it difficult to retrieve the line after casting.

When the device is to be used for casting, with the bait deeper than 5 feet, let us say 20 feet deep, the sleeve is to be set in the neutral position as in FIG. 2. The distal end of line 28 is then pulled out from the reel to the desired length, and at this point a small piece of string or rubber band is tied onto the line, above the tube 14 as shown at 36 in FIG. 2. The loose ends of string or band should be cut off, so they will not interfere with the casting. The angler now reels in the line and casts as usual. Since the sleeve is in the neutral position, the sinker will pull the line through the assembly until the knot 36 strikes the shoulders of opening 22, through which it cannot pass. Thus the float 10 will now support the sinker at whatever depth had been selected. It should be noted that this feature, which enables angler to fish at great depths, with a float which is also adapted to all other forms of fishing, is a unique advantage of this invention over conventional floats.

When it is desired to fish on the bottom, regardless of depth (known or unknown), the sleeve 20 is set in the neutral position as shown in FIG. 2 and the cast is made as usual. As the sinker descends in the water, the resistance of the line 28 to the constant deviations forced upon it as it slides through the openings 22 and 24 (or 26) keeps the float assembly in a vertical position on the surface. As soon as sinker 30 hits bottom, its pull on the line ceases and the float assembly drops to a horizontal position, shown in dotted lines in FIG. 1, which indicates to the angler that bottom has been reached. If the angler will now take up the slack in the line 28, the result will be that the portion of the line lying between the tip of the rod and the sinker will be substantially straight except for the four minute but sharp deviations in the line where it goes in and out of the radial openings 22 and 26 (or 22 and 24). With the line substantially straight, these four deviations will have the effect of effectively preventing the line from sliding through the float assembly whenever a bite or nibble is experienced. Thus the float will react to any bite in the same way as if it were fastened to the line. The basis for this feature is a specific application of the law of inertia, which need not be explained here. It should be noted that for best results, when a light line is used it is preferably to thread it through openings 22 and 24; whereas when a heavier line is used it should be threaded through holes 22 and 26 or less sharp deviations. It should also be noted that the heavier the line used, the heavier the sinker needs to be, for best results.

Where the term "hook" is used in the claims, it is to be understood that the term includes a lure which may be substituted for the hook.

From the foregoing, it will be apparent that the single, simple device illustrated and described is ideal for all standard forms of fishing. From the foregoing it will now be seen that there is herein provided an improved all-purpose fishing float which accomplishes all of the objects of this invention and others, including many advantages of great practical utility and commercial importance.

As various embodiments, may be made of this inventive concept, and as many modifications may be made in the embodiment herein before shown and described, it is to be understood that all matter herein is to be interpreted merely as illustrative, and not in a limiting sense.

I claim:

1. A fishing float construction apparatus, comprising a float element having a tube extending therethrough and extending outward from opposite ends thereof, said tube having an opening therethrough from end to end through which a fishing line is adapted to extend with a sinker and hook connected to the lower end of such line, selectively operable means for rendering the fishing line relatively freely slidable through said tube and for resisting such movement to predetermine the length of the line projecting below said tube, said selectively operable means comprising a sleeve surrounding said tube above said float element and adapted to assume an inoperative position resting on said float element at a point spaced from the upper end of said tube, such upper end of said tube being provided with at least two radial openings through the uppermost of which a fishing line is adapted to extend outwardly and downwardly along the side of said tube thence inwardly through one of the other said openings and downwardly through and beyond the lower end of said tube; said sleeve being movable upwardly to an operative position frictionally engaging the portion of the line lying outwardly of said tube between said openings to prevent free sliding movement of the fishing line axially relative to said tube, a flexible element knotted around fishing line above said tube and adapted to engage the uppermost of said radial openings to limit the sliding movement of said fishing line downwardly through said tube whereby, with sleeve in said inoperative position and said fishing line relatively freely slidable through said tube, the upper end of the line may be reeled in until the sinker engages the bottom of said tube whereupon the hook and sinker may be cast and the fishing line will slide through said tube until said knotted flexible element engages said upper radial opening to limit the further descent of said sinker and hook into water.

2. A device as claimed in claim 1 wherein said tube is flared outwardly at its upper end to prevent movement of said sleeve from the upper end of said tube, said tube throughout that portion of its length which passes through said float element being of uniform exterior cross-section whereby said sleeve can be slid over the lower end of said tube prior to its insertion through said opening in said float element, said tube having the surface of its lower extremity tapered to decrease in diameter to facilitate the insertion of said tube through said opening in said float element.

* * * * *